(12) United States Patent
Ben-Haim et al.

(10) Patent No.: US 7,402,813 B2
(45) Date of Patent: Jul. 22, 2008

(54) LENS SYSTEM FOR NUCLEAR MEDICINE GAMMA RAY CAMERA

(75) Inventors: Shlomo Ben-Haim, London (GB); Benny Rousso, Rishon-LeZion (IL); Shahram Moaddeb, Irvine, CA (US)

(73) Assignee: Spectrum Dynamics LLC, Orangeburg, NY (US)

( * ) Notice: Subject to any disclaimer, the term of this patent is extended or adjusted under 35 U.S.C. 154(b) by 0 days.

(21) Appl. No.: 11/610,196

(22) Filed: Dec. 13, 2006

(65) Prior Publication Data

US 2007/0145281 A1 Jun. 28, 2007

Related U.S. Application Data

(60) Provisional application No. 60/750,294, filed on Dec. 13, 2005.

(51) Int. Cl.
 *G01T 1/24* (2006.01)
(52) U.S. Cl. ............................................. 250/370.09
(58) Field of Classification Search ................................. 250/370.01–370.15
See application file for complete search history.

(56) References Cited

U.S. PATENT DOCUMENTS

| | | | |
|---|---|---|---|
| 3,464,322 A | 9/1969 | Pequignot | |
| 3,587,567 A | 6/1971 | Schiff | |
| 4,192,293 A | 3/1980 | Asrican | |
| 4,292,645 A | 9/1981 | Schlosser et al. | |
| 4,304,225 A | 12/1981 | Freeman | |
| 4,429,411 A | 1/1984 | Smithe | |
| 4,731,076 A | 3/1988 | Noon et al. | |
| 4,925,443 A | 5/1990 | Heilman et al. | |
| 5,004,319 A | 4/1991 | Smither | |
| 5,098,369 A | 3/1992 | Heilman et al. | |
| 5,131,905 A | 7/1992 | Grooters | |
| 5,132,542 A | 7/1992 | Bassalleck et al. | |
| 5,175,434 A | 12/1992 | Engdahl | |
| 5,383,840 A | 1/1995 | Heilman et al. | |
| 5,456,715 A | 10/1995 | Liotta | |
| 5,521,386 A * | 5/1996 | Taboada .................. 250/363.02 |
| 5,558,617 A | 9/1996 | Heilman et al. | |
| 5,713,954 A | 2/1998 | Rosenberg et al. | |

(Continued)

FOREIGN PATENT DOCUMENTS

EP 0280301 8/1988

(Continued)

OTHER PUBLICATIONS

U.S. Appl. No. 60/750,294.

(Continued)

*Primary Examiner*—David P. Porta
*Assistant Examiner*—Kiho Kim
(74) *Attorney, Agent, or Firm*—Wolf, Block, Schorr & Solis-Cohen LLP; William H. Dippert (57) ABSTRACT

A gamma ray camera system is provided, which includes a lens system comprising at least one crystal diffraction lens, and a camera. The camera is configured to perform gamma ray imaging of a first region of a volume of interest using the lens system, and perform gamma ray imaging of a second region of the volume of interest without using the lens system. Other embodiments are also described.

17 Claims, 9 Drawing Sheets

U.S. PATENT DOCUMENTS

| | | |
|---|---|---|
| 5,800,334 A | 9/1998 | Wilk |
| 5,869,841 A * | 2/1999 | Smither .................. 250/505.1 |
| 5,902,229 A | 5/1999 | Tsitlik et al. |
| 5,971,910 A | 10/1999 | Tsitlik et al. |
| 6,077,218 A | 6/2000 | Alferness |
| 6,099,460 A | 8/2000 | Denker |
| 6,120,431 A | 9/2000 | Magovern et al. |
| 6,123,724 A | 9/2000 | Denker |
| 6,126,590 A | 10/2000 | Alferness |
| 6,155,972 A | 12/2000 | Nauertz et al. |
| 6,165,121 A | 12/2000 | Alferness |
| 6,165,122 A | 12/2000 | Alferness |
| 6,206,820 B1 | 3/2001 | Kazi et al. |
| 6,238,334 B1 | 5/2001 | Easterbrook, III et al. |
| 6,251,061 B1 | 6/2001 | Hastings et al. |
| 6,254,525 B1 | 7/2001 | Reinhardt et al. |
| 6,259,762 B1 | 7/2001 | Pastyr et al. |
| 6,296,605 B1 | 10/2001 | Michelman et al. |
| 6,375,608 B1 | 4/2002 | Alferness |
| 6,398,715 B1 | 6/2002 | Magovern et al. |
| 6,406,422 B1 | 6/2002 | Landesberg |
| 6,508,756 B1 | 1/2003 | Kung et al. |
| 6,540,659 B1 | 4/2003 | Milbocker |
| 6,544,168 B2 | 4/2003 | Alferness |
| 6,572,534 B1 | 6/2003 | Milbocker |
| 6,595,912 B2 | 7/2003 | Lau et al. |
| 6,602,182 B1 | 8/2003 | Milbocker |
| 6,602,184 B2 | 8/2003 | Lau et al. |
| 6,612,978 B2 | 9/2003 | Lau et al. |
| 6,612,979 B2 | 9/2003 | Lau et al. |
| 6,616,596 B1 | 9/2003 | Milbocker |
| 6,626,821 B1 | 9/2003 | Kung et al. |
| 6,663,558 B2 | 12/2003 | Lau et al. |
| 6,682,474 B2 | 1/2004 | Lau et al. |
| 6,682,475 B2 | 1/2004 | Cox et al. |
| 6,702,732 B1 | 3/2004 | Lau et al. |
| 6,949,748 B2 * | 9/2005 | Ziock et al. ............ 250/370.01 |
| 2001/0003802 A1 | 6/2001 | Vitale |
| 2001/0041821 A1 | 11/2001 | Wilk |
| 2003/0209677 A1 * | 11/2003 | Kumakhov .............. 250/505.1 |
| 2005/0175148 A1 * | 8/2005 | Smither ...................... 378/84 |

FOREIGN PATENT DOCUMENTS

| | | |
|---|---|---|
| EP | 0583012 | 2/1994 |
| WO | WO 02/28450 | 4/2002 |

OTHER PUBLICATIONS

R.K. Smither, et al. "Crystal Diffraction Lens Telescope For Focusing Nuclear Gamma Rays", SPIE 1996, Denver, CO, Aug. 4-9, 1996.

D. Pellicciotta, et al., Laue Lens Development For Hard X-Rays (>60 Kev), Nov. 16, 2005.

H.O. Anger, "A New Instrument For Mapping Gamma Ray Emitters", Biology And Medicine Quarterly Report, U.C.R.L. 3653, 1957.

Bassalleck, et al., "Semiconductor gamma cameras in nuclear medicine", IEEE Trans. On Nuclear Science, vol. NS-27, No. 3, Jun. 1980.

Kaufman, et al., "Two-detector, 512 element, high purity germanium camera prototype", IEEE Trans. On Nuclear Science, vol. NS-25, No. 1, Feb. 1978.

"Gamma WAVE: Focusing telescopes in nuclear astrophysics", Sep. 12-15, 2005, Escape St. Jacques, Bonifacio, Corsica.

Everett DB, et al., "Gamma-Radiation Imaging System Based On The Compton Effect", Proc. IEEE, vol. 124 (11), (1977), p. 995.

Cree, et al., "Towards Direct Reconstruction from a Gamma Camera Based on Compton Scattering", IEEE Transactions on Medical Imaging, vol. 13, No. 2, Jun. 1994, pp. 398-407.

* cited by examiner

LENS SYSTEM FOR NUCLEAR MEDICINE GAMMA RAY CAMERA

CROSS-REFERENCES TO RELATED APPLICATIONS

The present patent application claims the benefit of U.S. Provisional Patent Application 60/750,294, filed Dec. 13, 2005, entitled, "Lens system for nuclear medicine gamma ray camera," which is incorporated herein by reference.

FIELD OF THE INVENTION

The present invention relates generally to nuclear imaging, and specifically to lens systems for gamma cameras.

BACKGROUND OF THE INVENTION

Nuclear medicine imaging is performed by injecting a radiopharmaceutical into a patient and measuring the intensity distribution of gamma radiation emitted from the patient's body. Radiopharmaceuticals are prepared by attaching a radioactive tracer to a pharmaceutical that is known to preferentially accumulate in an organ of interest. The detected radiation pattern thus provides information about the function of the organ.

A majority of current radiation detection systems utilize an "Anger"-type gamma scintillation camera for determining the radiation pattern emitted from patient's body. (The camera is named after its inventor, H. O. Anger, see, for example, "A new instrument for mapping gamma ray emitters," Biology and Medicine Quarterly Report, U.C.R.L.-3653, 1957, which is incorporated herein by reference.) These nuclear medicine imagers use large sodium iodide scintillating crystals in conjunction with a bank of photomultipliers tubes (PMTs). A collimating aperture in front of the scintillation crystal focuses the gamma rays on the crystal, and gamma rays from a radiopharmaceutical injected into the patient produce scintillations (light flashes) in the crystal which are converted into electrical signal by the PMTs. High density shielding material, typically comprising lead, is used to cover the sides and back of the radiation detection assembly to prevent radiation from entering the detector by any path other than through the collimator. A computer locates each flash from the relative magnitudes of the PMT signals. Crystals are typically 200 to 400 square inches in area (1290 to 2580 square centimeters).

Limitations of Anger cameras are mainly caused by the conversion of scintillations into electrical signals. Sources of distortion include variation of the acceptance field-of-view angle of the PMTs with distance from the scintillation event, refraction and light guiding due to index of refraction mismatches, unavoidable dead regions between PMTs, and non-uniform spatial response of individual PMTs.

Semiconductor detector-array imagers have been proposed for solving problems with Anger cameras. For example, see U.S. Pat. Nos. 4,292,645 to Schlosser et al. and 5,132,542 to Bassalleck et al.; "Semiconductor gamma cameras in nuclear medicine," IEEE Transactions on Nuclear Science, Vol. NS-27, No. 3, June 1980; and "Two-detector, 512-element, high purity germanium camera prototype," IEEE Transactions on Nuclear Science, Vol. NS-25, No. 1, February 1978. All of these references are incorporated herein by reference. Semiconductor detectors have improved camera sensitivity, particularly at 100 to 250 Kev energy levels. This improved sensitivity has led to improved energy resolution by at least factor of two over Anger cameras.

In an attempt to further improve sensitivity and accuracy, several lens constructions and materials have been proposed by Robert Smither in U.S. Pat. Nos. 5,869,841 and 5,004,319, and US Patent Application Publication 2005/0175148, all of which are incorporated herein by reference. U.S. Pat. No. 4,429,411 to Smither, which is incorporated herein by reference, describes techniques for focusing X-rays and gamma An article entitled, "Gama WAVE: Focusing telescopes in nuclear astrophysic," Sep. 12-15, 2005, Espace St. Jacques, Bonifacio, Corsica, which is incorporated herein by reference, provides an overview of techniques for focusing gamma rays for nuclear astrophysics telescopes.

Compton scatter cameras have been proposed to overcome some of the limitations of Anger cameras. Compton scatter cameras have been described in numerous publications, including the following, all of which are incorporated herein by reference:

Everett D B et al. in the paper entitled Gamma-radiation Imaging System Based On the Compton Effect, Proc. IEE, Vol. 124 (11), (1977), p. 995;

Cree et al. "Towards Direct Reconstruction from a Gamma Camera Based on Computer Scattering," IEEE Transactions on Medical Imaging, Vol. 13, No. 2, June 1994, pp. 398-407; and U.S. Pat. No. 5,175,434 to Engdahl (see the description provided with reference to FIG. 1 thereof in the Background of the Invention section).

The '434 patent describes a Compton scatter camera for nuclear medical imaging that includes an annular scattered photon detector disposed around a first scattering detector and shielded from the field of view of incident gamma photons. Scattered photons detected by the annular detector are thus scattered through angles greater than those of a conventional Compton scatter geometry.

Gamma cameras are manufactured by companies such as GE, Siemens, Hitachi, Toshiba, Philips, and Spectrum Dynamics.

All of the references (including patent references and articles) referred to herein are incorporated herein by reference.

SUMMARY OF THE INVENTION

In some embodiments of the present invention, a gamma camera/PET camera is combined with a lens or lens system, such as one of the lenses or lens systems described hereinbelow and/or in the references mentioned hereinabove in the Background of the Invention section. A lens system and a camera work in somehow opposite ways: while conventional cameras have a relatively large volume of interest (e.g., between a few centimeters and tens of cubic centimeters) with roughly uniform sensitivity and resolution, the lens is practically very effective for a focal region (e.g. with a cross-section of about 1 cm or less, and a depth of field of about 3 cm or less). While a commercially available camera has sensitivity to photons in the centimeter scale, the lens system of these embodiments of the present invention has poor sensitivity in that entire volume, and extremely high sensitivity at the focal point. For example, the lens system may have less than $\frac{1}{10}$ the sensitivity outside the focal point, and greater than 10× (sometimes even much greater than 10×, such as more than 100×) the sensitivity at the focal point. ("Sensitivity," as used in the present application, including the claims, means the ratio of detected photons (count rate) to emitted photons.) Therefore, the resolution achieved within the focal region is typically less than about 2 mm, e.g., less than about 1 mm.

An imaging system is therefore provided, in accordance with some embodiments of the present invention, which combines the two system mentioned above, i.e., general imaging which is either followed and/or performed simultaneously with focused imaging. For some applications, such focused imaging may be characterized as "needle" imaging, which is similar to a virtual "needle biopsy" from the focused target region.

In some embodiments of the present invention, the two imaging approaches are combined to improve gamma radiation reconstruction approaches. For example, one may image an object, then further clarify small region of interest by using the lens (e.g., targeted imaging of hot or cold spots, exact imaging of object boundaries, clarifying the image in point of special clinical value, etc.).

In some embodiments of the present invention, such a combined approach is used for dynamic/kinetic studies, in which a biological process is to be imaged or analyzed over time. In some studies, at least one region of interests is identified, and the lens system(s) is focused to the at least one region alone, and changed of radiation over time are traced, in order to demonstrate the kinetic of a biological process, e.g. uptake of a radiopharmaceutical by cell/tissue, release, metabolism, etc.

For some applications, the use of such a lens as part of such studies enables a marked reduction in the undesired effect of partial volume (a "voxel" that includes more than one tissue type, such that the emission from that voxel is a mixture rather than clearly distinct).

In some embodiments of the present invention, a lens system is provided that comprises an object tracking system. Since body organs may be subject to motion (e.g., heart contraction, breathing, gut movement, or other undesired motion), or some studies may even require motion (inspiration/expiration, cardiac ejection fraction, etc.), the combination of the lens system with an object tracking system (of any kind) allows the lens system to follow the target motion and continue to produce high quality acquisition from the target point even in the presence of motion. Object tracking may be provided using, for example, a position (and/or angulation) sensor associated with the target region or with a tissue/organ that is with motion relationship with said target region (e.g., bones, joints, skin, major blood vessels, etc.). Alternatively or additionally, object tracking may be provided by using the system in combination with an imaging modality that allows object tracking and/or motion analysis.

For some applications, such motion compensation further comprises using a gating technique, such as to segment data acquired over time into "time gates" that reflect different stages of a physiological process. For example, gating by ECG allows producing distinct results (images/acquisitions) for the various cardiac cycle states (e.g. systole, diastole, changes between them, etc.).

In some embodiments of the present invention, in order to produce an effective and practical use of a lens system, one or more of the following techniques are used:

a system is combined with a guiding system, whether by pre-imaging of the patient and planning and adjusting the lens towards the target site, or by on-line guidance. Such guidance may be provide by any other modality, including, for example, MRI, CT, ultrasound, use of fiduciary points, or measurements relative to a frame or relative to bones of the patient;

the guidance may arise from initial imaging by a SPECT/PET camera and use the initial image (2D, 3D, or other data) produced to determine the desired lens guidance towards focusing on the exact location and orientation of interest.

For some applications, the lens is used to more accurately obtain information at depths, locations, and/or orientations that are more problematic to image using a conventional camera (because of sensitivity, coverage, distance, attenuation, or other factors).

In some embodiments of the present invention, an effect of scatter is reduced by using a lens system. Because different energies of photons produce different focal planes, masking undesired planes may be used to limit radiation focusing of energies other than a desired plane. Therefore, a lens, whether used alone or combined with a gamma camera, allows the addition of information that depends less (or differently) on scatter, and thus contributes to the reconstruction algorithm about the source of emission.

In some embodiments of the present invention, a lens system is combined with any other procedure, including for guiding a procedure, such as catheterization, surgical tool, radiation therapy, or a drug delivery tool. For some applications, as a portion of the guidance modalities that are used in the procedure, a lens system may be combined in the procedure or as integral part of an apparatus that allows the therapy to be performed based on the information collected by the lens (e.g., tracer uptake indicating tumor cells, etc.). For some applications, at least a portion of the therapy is provided through the lens itself, either as a focused radiation therapy at high doses that is emitted from outside and focused internally at the target (and thus minimize radiation damage to collateral tissue), or by means that use the lens structure as a "pipe" or "tunnel" for exactly targeting a "needle" in a straight line towards the target tissue to be treated.

In some embodiments of the present invention, a Compton scatter camera is provided that comprises primary and secondary detectors, and at least one crystal diffraction lens positioned in front of the primary or secondary detector. For some applications, at least one lens is positioned in front of both the primary and secondary detectors. For some applications, such lenses are coupled to the surface of the primary and/or secondary detectors, while for other applications the lens are placed near the primary and/or secondary detectors, but are not coupled to the surfaces thereof. For these latter applications, the camera may be configured to move one or more of the lenses with respect to the primary and/or secondary detectors in order to control the focal length of the lenses. Typically, the primary detector and/or secondary detector comprise Cadmium-Zinc-Telluride (CZT).

In some embodiments of the present invention, the lens and other techniques described herein are used for cameras other than Compton scatter cameras, such as for gamma (e.g., SPECT) and/or PET cameras.

In some embodiments of the present invention, at least one of the lenses or the primary or secondary detectors is provided with a microporous surface. The microporous surface improves scattering while maintaining the small physical size of the lenses and/or detectors. For some applications, the microporous surface is provided by applying a microporous coating to the lens or detector, such as by using ion implantation, while for other applications the surface of the lens or detector is treated to create a microporous layer. Typically, the microporous surface includes an organized crystalline structure, e.g., diamond-shaped crystals. Alternatively, the surface is randomly or quasi-randomly organized.

In some embodiments of the present invention, a system of highly sensitive smart lenses that focus incoming photons onto the primary and/or secondary detectors. The lenses are typically small enough and yet have the ability capture as much energy as the relatively large lenses described in the above-mentioned patents and patent application publication to Smither. Furthermore, techniques of come embodiments of the present invention provide improved (e.g., adjustable) depth of field by providing for dynamic changing of focal length, and for placement of the primary detector closer to the source of radiation (within the patent) and the secondary detector.

In some embodiments of the present invention, an imaging system is provided that comprises at least one primary detector for sensing radiation emitted from a body of a patient, at least one focusing lens in front of the primary detector (i.e., between the primary detector and the source of radiation), electronics for conditioning and processing the detected radiation signals, a computer for controlling the detection process and for forming and displaying images based upon the signals generated by the detectors, and output devices for displaying the images and providing data to a user.

In some embodiments of the present invention, a lens is provided that comprises a plurality of photon-scattering layers. The lens comprises at least two layers, and typically at least three layers. The materials of the layers are typically selected to provide alternating layers of relatively high and relatively low indices of refraction, e.g., high/low/high or low/high/low, in order to provide a "graded index," as is known in the art of optical lenses for visible light. The multilayer construction generally improves absorption. The layers typically comprise dense materials such as cooper, germanium, and quartz. Adjacent layers comprise different materials than one another, in order to provide differing indices of refraction. Such a multi-layer lens is coupled to or placed in front of a detector, such as a CZT detector.

In some embodiments of the present invention, adjustable smart lenses are provided that are configured to adapt their shape and/or size. Such adjustment of shape and/or size generally increases lenses power and the amount of collected photons.

In some embodiments of the present invention, a set of lenses are placed at different locations around a patient. One set of one or more lenses is placed in front of the primary detector in order to focus and direct the photons into the primary detector. A second set includes one or more lenses which are placed as so as to focus onto different respective areas of the secondary detectors in order to direct scatter photons to the secondary detectors. Such placement of the lens at different locations around the patient enables the generation of more accurate information on the location and three dimensional size of an anatomical structure of interest (e.g., a tumor) than is possible using conventional gamma cameras.

Lenses similar to those described in the above-mentioned patents and patent application publication to Smither have a depth of field of a few centimeters, due to the limited angular shift that the lens can make to these photons. A few centimeter depth of field has advantages and disadvantages. An advantages is that anything before those few centimeters and anything after those few centimeters becomes blurred and thus does not damage the imaging of the target region too much. If the region of interest is a few centimeters thick (e.g., heart), then this is actually a good property that allows generation of a region of interest (ROI).

In some embodiments of the present invention, an automatic scan of depth for optimal coverage of the organ of interest is provided. The technique of "shape from focus," as is known in the art of computer vision, includes adjusting the focal length during image acquisition, to provide a clear image every time of different depths in the region of interest. The focused images are combined to produce a complete 3D image of a structure, without the need to move the camera (only the lens is moved). A disadvantage of a few centimeters depth of field is that in order to use this approach for 3D reconstruction by current lens, a few millimeters depth of resolution is needed, not a few centimeters.

In these embodiments of the present invention, the depth is reconstructed using an algorithm, pursuant to which multiple recordings are made, and at each step the lens is moved towards its respective detector by between about 1 and about 10 mm, e.g., between about 2 and about 4 mm, such as about 3 mm, and the blurring along the depth axis is deconvolved. For some applications, this approach is combined with additional view angles provided by moving the entire detector assembly.

Without the use of this adjustable lens technique, only computerized tomography is provided, in which each view creates a "pencil"-like region, e.g. about 3 mm×about 3 mm×about 5 cm which is measured and reconstruction takes place from multi view angles.

In an embodiment of the present invention, the limited depth of field is used to help detect the location of the source of radiation.

In an embodiment of the present invention, lenses are incorporated onto the surface of detectors, e.g., CZT detectors. Because no lens is able to perfectly capture and focus the photons onto a sharp point like a laser, even with focusing there will be some photon escaping. By incorporating additional lenses right onto or very close to the CZT detectors, the system captures and focuses more photons. For some applications, a thin layer of Copper or Germanium is deposited onto the surface of a CZT semiconductor. The techniques of this embodiment may be used separately or in combination with the other techniques described herein, including the providing of at least one lens between the patient and the primary detectors.

Some embodiments of the present invention provide a method and device for high resolution imaging by utilizing various lens configurations and construction. Some embodiments of the present invention minimize the number of lenses required while still maintaining sensitivity.

There is therefore provided, in accordance with an embodiment of the present invention, a gamma ray camera system including:

a lens system including at least one crystal diffraction lens; and a camera, configured to:

perform gamma ray imaging of a first region of a volume of interest using the lens system, and perform gamma ray imaging of a second region of the volume of interest without using the lens system.

For some applications, the second region has a volume at least 10 times a volume of the first region, such as at least 100 times the volume of the first region.

For some applications, the camera and lens system are configured to image the first region with a first sensitivity equal to at least 10 times a second sensitivity of imaging of the second region, such as at least 100 times the second sensitivity.

In an embodiment, the camera is configured to simultaneously image the first and second regions.

In an embodiment, the camera is configured to image the second region after completing imaging of the first region. For some applications, the camera is configured so set at least one parameter of imaging of the second region at least in part responsively to information derived from imaging the first region.

In an embodiment, the camera is configured to image the first region after completing imaging of the second region. For some applications, the camera is configured so set at least one parameter of imaging of the first region at least in part responsively to information derived from imaging the second region.

There is further provided, in accordance with an embodiment of the present invention, a method for gamma ray imaging including:

performing gamma ray imaging of a first region of a volume of interest using a lens system that includes at least one crystal diffraction lens; and performing gamma ray imaging of a second region of the volume of interest without using the lens system.

There is still further provided, in accordance with an embodiment of the present invention, a gamma ray camera system including:

at least one gamma ray photon detector;

an object tracking system, configured to generate a signal indicative of motion of a target region of interest (ROI);

a lens system including at least one crystal one crystal diffraction lens, configured to focus photons onto the at least one photon detector; and a control component, configured to receive the signal and, responsively thereto, adjust a focusing parameter of the lens system to compensate at least in part for the motion.

For some applications, the focusing parameter includes a focal length of the at lest one crystal diffraction lens. Alternatively or additionally, the focusing parameter is selected from the group consisting of: an orientation of the lens system, an orientation of the at least one crystal diffraction lens, and both the orientation of the lens system and the orientation of the at least one crystal diffraction lens. Further alternatively or additionally, the focusing parameter is selected from the group consisting of: a position of the at least one crystal diffraction lens with respect to the target ROI, a position of the lens system with respect to the target ROI, and both the position of the at least one crystal diffraction lens and the position of the lens system with respect to the target ROI.

In an embodiment, the control component is configured to segment data derived from the photons detected by the photon detector into time gates, responsively to the received signal.

There is additionally provided, in accordance with an embodiment of the present invention, a method for gamma ray imaging including:

focusing gamma ray photons onto at least one photon detector using a lens system including at least one crystal diffraction lens;

detecting the photons by the photon detector;

generating a signal indicative of motion of a target region of interest (ROI);

responsively to the signal, adjusting a focusing parameter of the lens system to compensate at least in part for the motion.

There is yet additionally provided, in accordance with an embodiment of the present invention, a gamma ray camera system including:

at least one crystal diffraction lens; and a coating on the lens.

For some applications, the coating includes an anti-reflection coating.

There is also provided, in accordance with an embodiment of the present invention, a gamma ray lens assembly including at least one gamma ray lens, which includes:

a first layer, which includes a first crystal diffraction material; and a second layer, adjacent to the first layer, which includes a second crystal diffraction material different from the first crystal diffraction material.

For some applications, at least one of the first and second layers include a material selected from the group consisting of: copper, germanium, quartz, and silicon.

For some applications, the gamma rays lens assembly includes a photon detector, and the lens and the detector are arranged such that the lens focuses photons onto the detector.

Typically, the first and second crystal diffraction material have difference indices of refraction.

In an embodiment, a first thickness of the first layer is less than a second thickness of the second layer. For some applications, the lens includes a third layer, which includes a third crystal diffraction material different from the second crystal diffraction material. Typically, a third thickness of the third crystal diffraction material is greater than the second thickness. For some applications, the third crystal diffraction material is the same as the first crystal diffraction material.

There is further provided, in accordance with an embodiment of the present invention, a gamma ray lens assembly including at least one gamma ray crystal diffraction lens, which includes a microporous surface.

For some applications, the microporous surface includes a microporous coating of the lens.

There is still further provided, in accordance with an embodiment of the present invention, a gamma ray camera system including:

at least one gamma ray photon detector;

a lens system including at least one crystal diffraction lens; and a control component, configured to adjust a focal length of the lens.

For some applications, the control component is configured to adjust the focal length during an imaging procedure performed by the camera system.

The present invention will be more fully understood from the following detailed description of embodiments thereof, taken together with the drawings, in which:

DETAILED DESCRIPTION OF EMBODIMENTS

Figure 10:
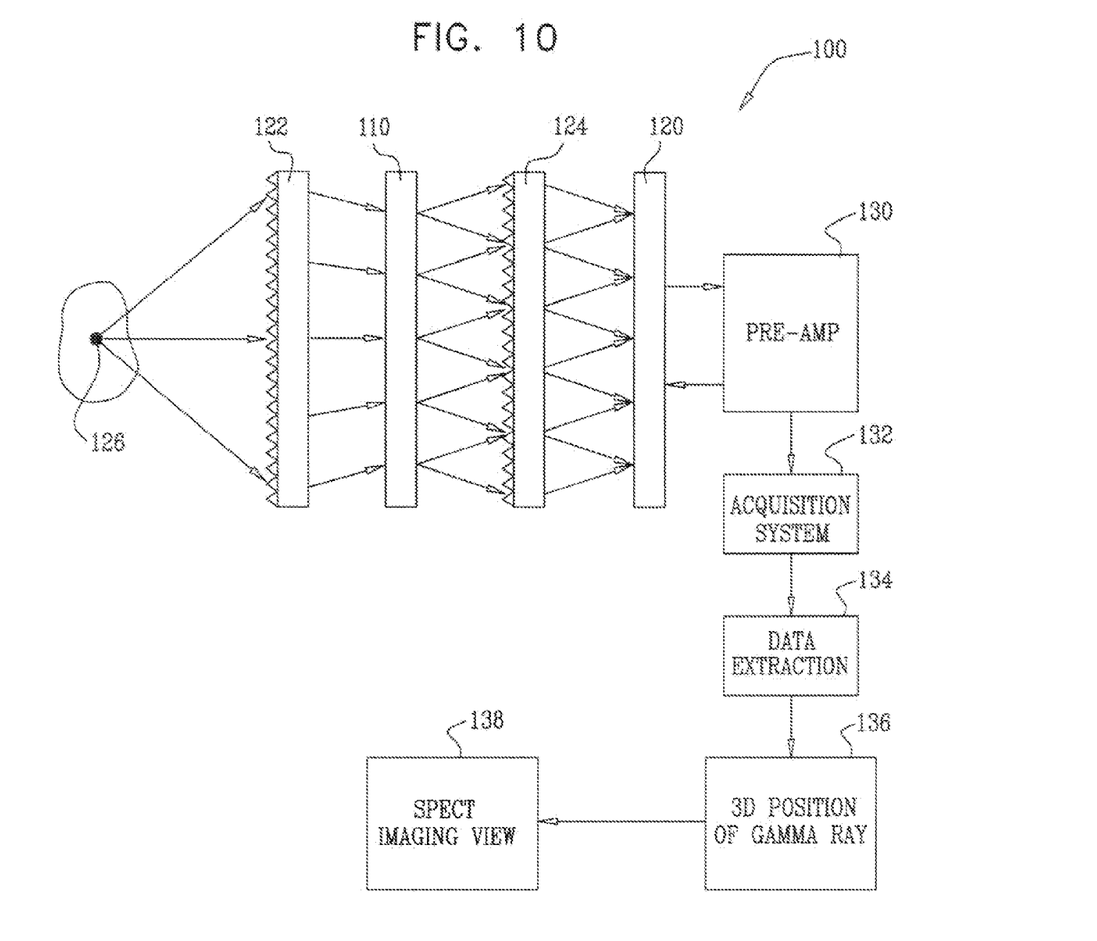
FIG. 10 is a schematic illustration of a camera system, in accordance with an embodiment of the present invention.

Reference is made to FIG. 10, which is a schematic illustration of gamma ray camera system 100 comprising a plurality of crystal diffraction lenses that are placed one in front of the other, in accordance with an embodiment of the present invention. The system is designed to optimize detection of gamma rays by incorporating various lens arrays and configurations around a patient.

System 100 typically comprises a primary detector 110 and a secondary detector 120, which are generally similar to primary and secondary detectors in conventional Compton scaffer cameras, except as described herein. Typically, primary detector 110 comprises copper, germanium, quartz, or silicon. Secondary detector 120 typically comprises CZT. System 100 further comprises a primary lens 122 and/or a secondary lens 124, which are positioned, respectively, in front of (i.e., closer to a gamma ray-emitting region of interest 126) primary detector 110 and second detector 120. Photons are focused by primary lens 122 onto primary detector 110, which Compton scatters a portion of the photons onto secondary lens 124, which in turn focuses these gamma rays on secondary detector 120. System 100 typically further comprises a pre-amplifier 130, an acquisition system 132, a data extraction module 134, a 3D position of gamma ray module 136, and a SPECT imaging view module 138.

Gamma ray camera system 100 thus comprises a plurality of crystal diffraction lens that are placed one in front of the other. This enables real-time focal point adjustability by moving one lens association with the other. This is an important feature in order to have adjustability, particularly with a moving target such as beating heart or lung movement due to breathing, or other body motion, such as those motions mentioned hereinabove.

Reference is made to FIGS. 1A-D, which are schematic illustrations of ring-type gamma ray lenses, in accordance with respective embodiments of the present invention. In these embodiments, two or more ring-type lenses move in concert and independently of each other. This provides the ability to focus the beam at various directions and locations, including changing the focal length of the lenses. The techniques of this embodiment of the present invention allow the use of fewer lenses than techniques known in the art (because the lens are moved around the patient). These techniques provide better ability and flexibility not only in terms of manufacturing cost/challenges but more importantly related to being able to adapt it more accurately in clinical setting.

Figure 1A:
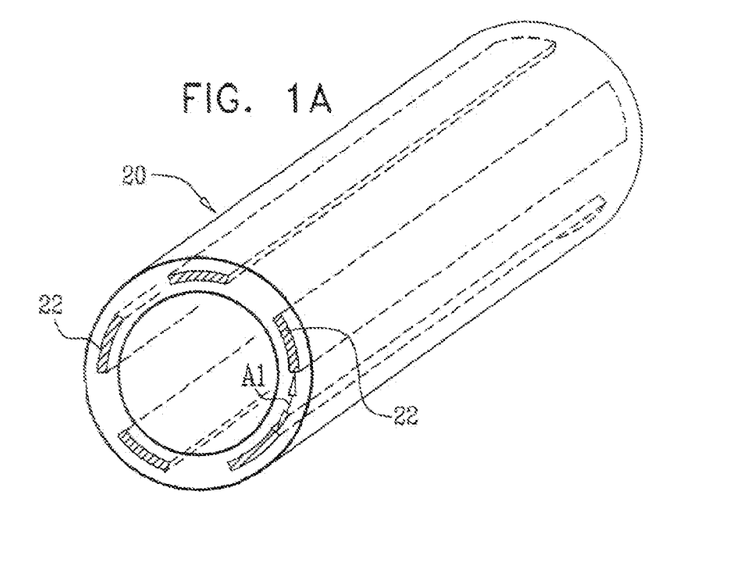
FIGS. 1A-D are schematic illustrations of ring-type gamma ray lenses, in accordance with respective embodiments of the present invention.

FIG. 1A shows a cylindrical lens holder 20, which holds one or more elongated semicircular lenses 22. Lenses 22 typically are radially spaced apart by a distance of A1. Lens holder 20 typically has a diameter of between about 5 cm to about 40 cm, such as between about 5 cm and about 20 cm. Each ring is typically cylindrical and typically has a length equal to between about 0.1 and about 20 times the radius of the ring, such as between about 1 and 5 times, or between 5 and 10 times. The primary or secondary detector is typically placed within the lens holder or around the lens holder, or longitudinally beyond the lens holder. Each lens 22 can focus on single or multiple point sources. (Although lens holder 20 is shown in the figures as cylindrical in shape, it may be of any equivalent shape such as square, elliptical, circular, etc.)

Each lens 22 can be anywhere from surface contact on the patient to distance about 200 cm, e.g., less than 100 cm. For some applications, each lens 22 has a different Bragg angle, to create 3-dimensional imaging.

Figure 1B:
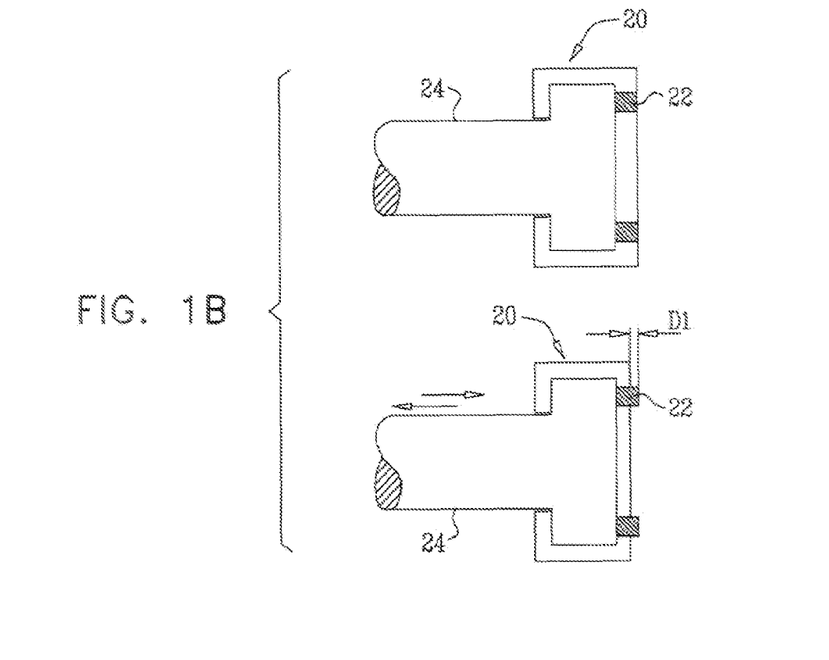

Lens holder 20 is typically configured to controllably move lenses 22 in a longitudinal direction with respect to lens holder 20, in order to focus the lenses. The lenses can typically be moved independently of one another, or together as a group. FIG. 1B shows one exemplary mechanism for longitudinally moving lenses 22. This mechanism comprises an adjustable member 24, which is moved longitudinally with respect to lens holder 20, thereby moving lenses 22. For example, the adjustment shown in the two figures of FIG. 1B moves lenses 22 by a longitudinal distance D1.

Figure 1C:
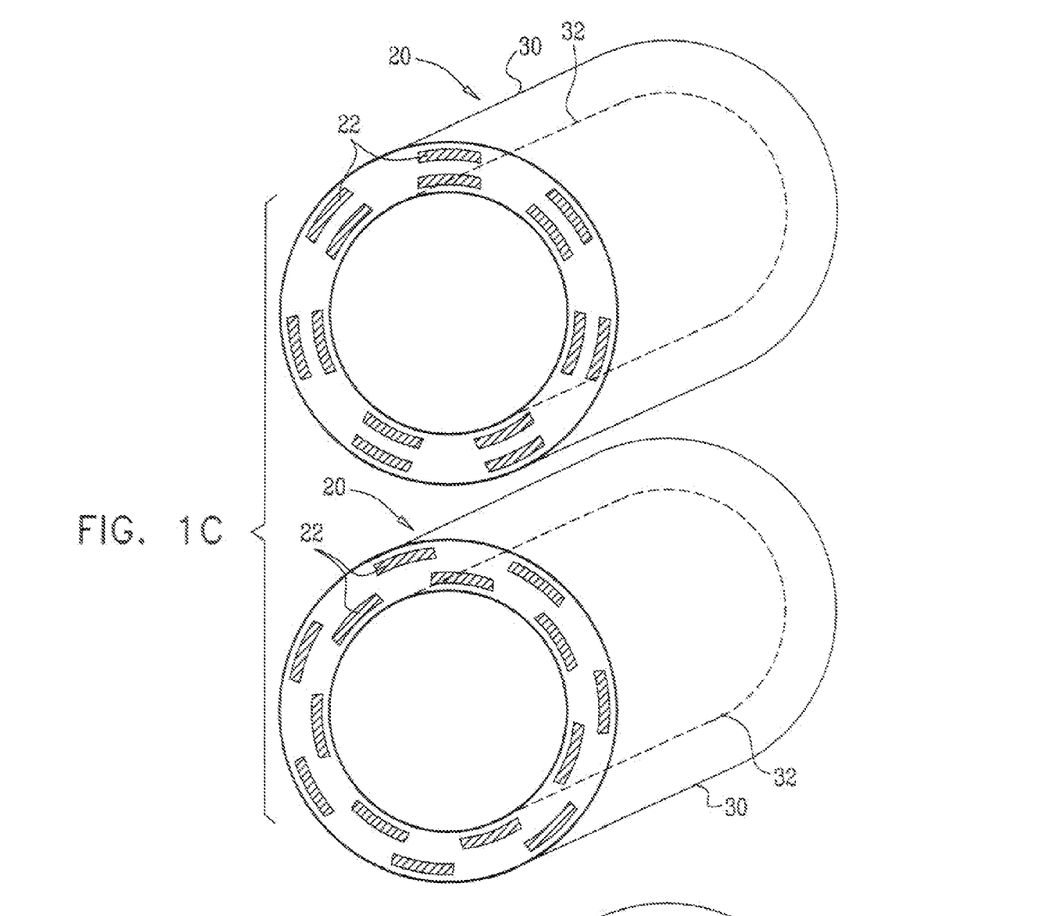

FIG. 1C shows a configuration in which lenses 22 are arranged in inner and outer rows. Lens holder 20 typically comprises two concentric cylinders: an outer cylinder 30 and an inner cylinder 32, between which lenses 22 are positioned. The lenses in the outer row are movable independently of the lenses in the inner row, for example from the rotational position shown in the first figure of FIG. 1C to the rotational position in the second figure of FIG. 1C. For some applications, the lenses may be longitudinally moved, either together or independently from one another, such as described hereinabove with reference to FIG. 1A.

Figure 1D:
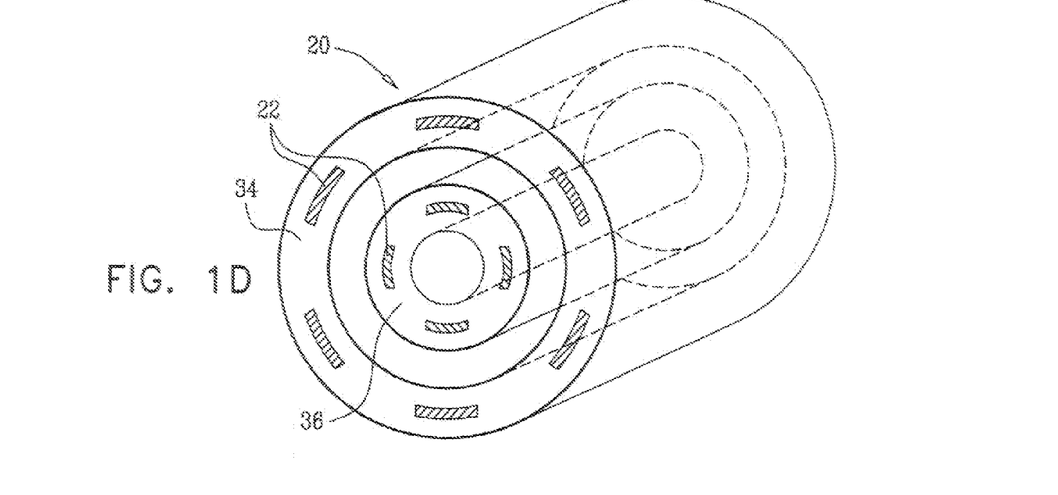

FIG. 1D shows a configuration of lens holder 20 in which the lens holder comprises an outer cylinder 34 and an inner cylinder 36, which are able to rotate independently of one another in order to rotate their respective lens 22 with respect to the lens of the other cylinder. For some applications, cylinders 34 and 36 are also longitudinally movable with respect to one another.

Figures 2, 3:
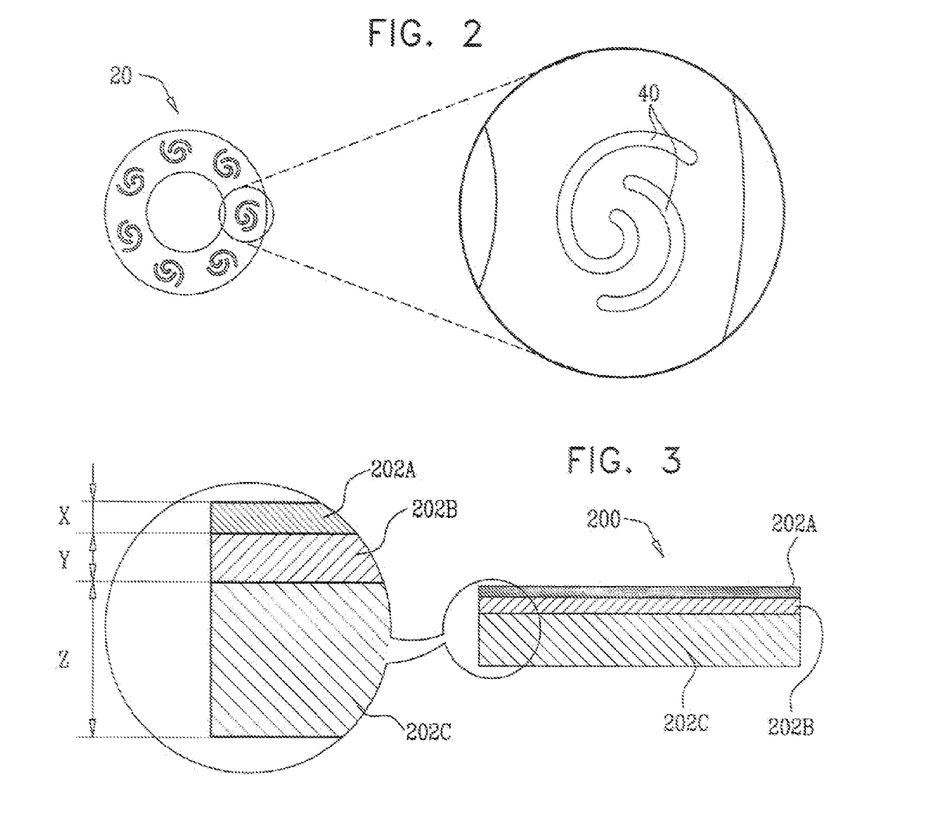
FIG. 2 is a schematic illustration of a spiral-shaped gamma ray lens, in accordance with an embodiment of the present invention.
FIG. 3 is a schematic cross-sectional illustration of a multi-layer stacked gamma ray lens, in accordance with an embodiment of the present invention.

Reference is made to FIG. 2, which is a schematic illustration of a spiral-shaped gamma ray lens 40, in accordance with an embodiment of the present invention. In this embodiment, the gamma ray lenses have the shape of a spiral. One or two spiral lenses 40 can be utilized. Each spiral can be in same or opposite direction (clockwise or counterclockwise). Each spiral can be moved independently of one other. By having various lenses positioned in a spiral configuration, the spacing and distance of each lens can be altered with respect to another lens, thereby altering the focus and amount detection accuracy. This allows the use of fewer lenses in comparison to current devices with fixed ring size and configurations.

Figure 9A:
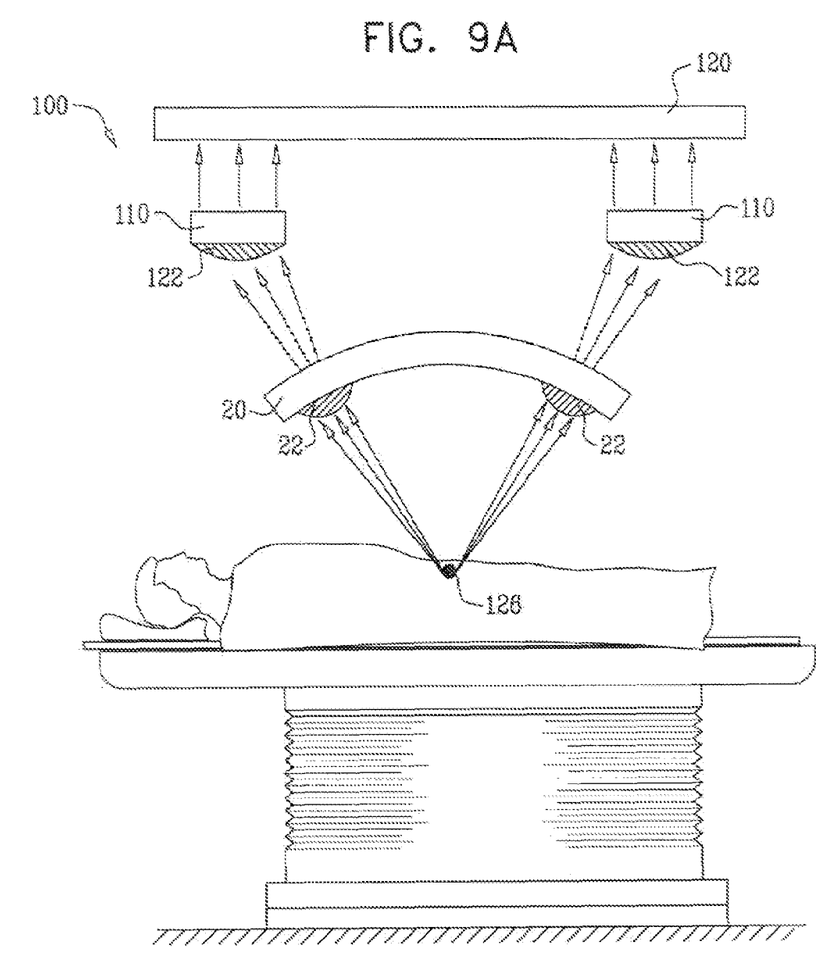
FIGS. 9A-C are schematic illustrations of lens systems that include lenses on detector surface, in accordance with respective embodiments of the present invention.
Figure 9B:
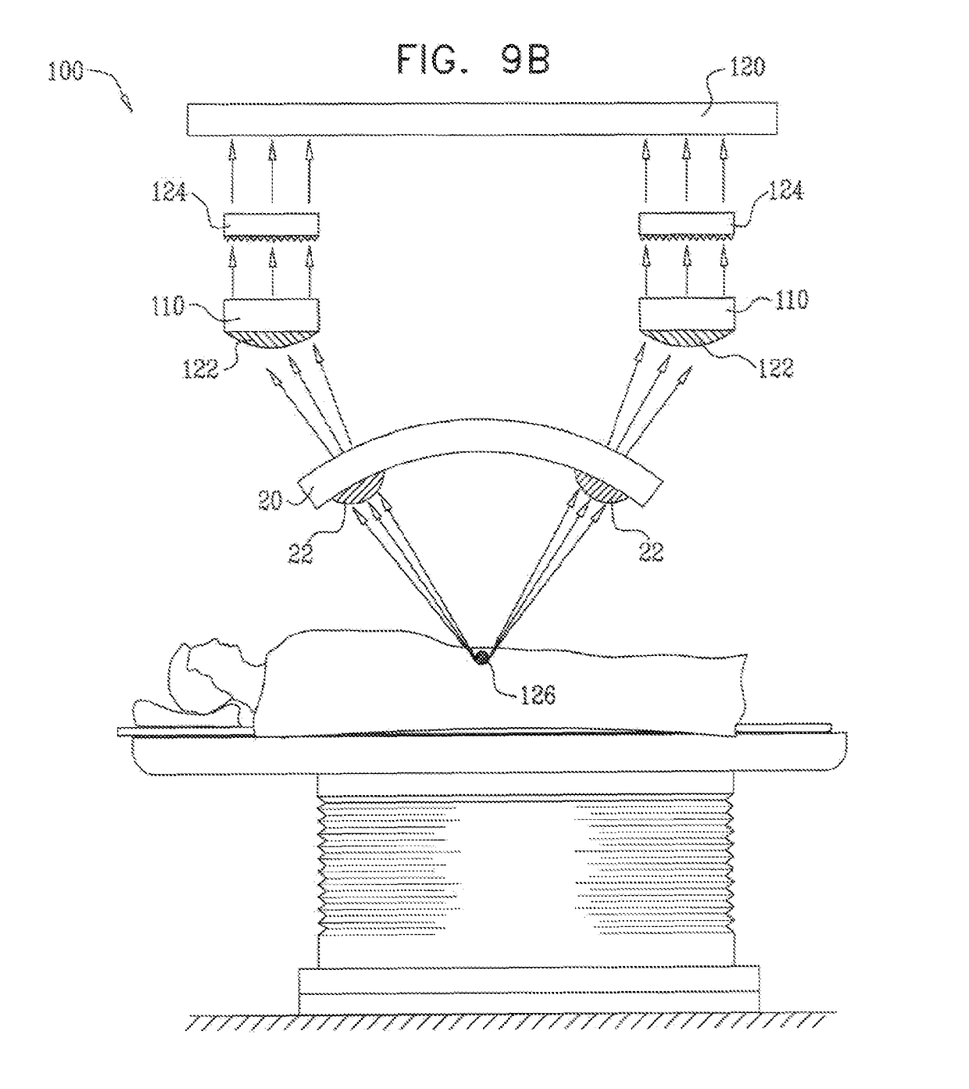
Figure 9C:
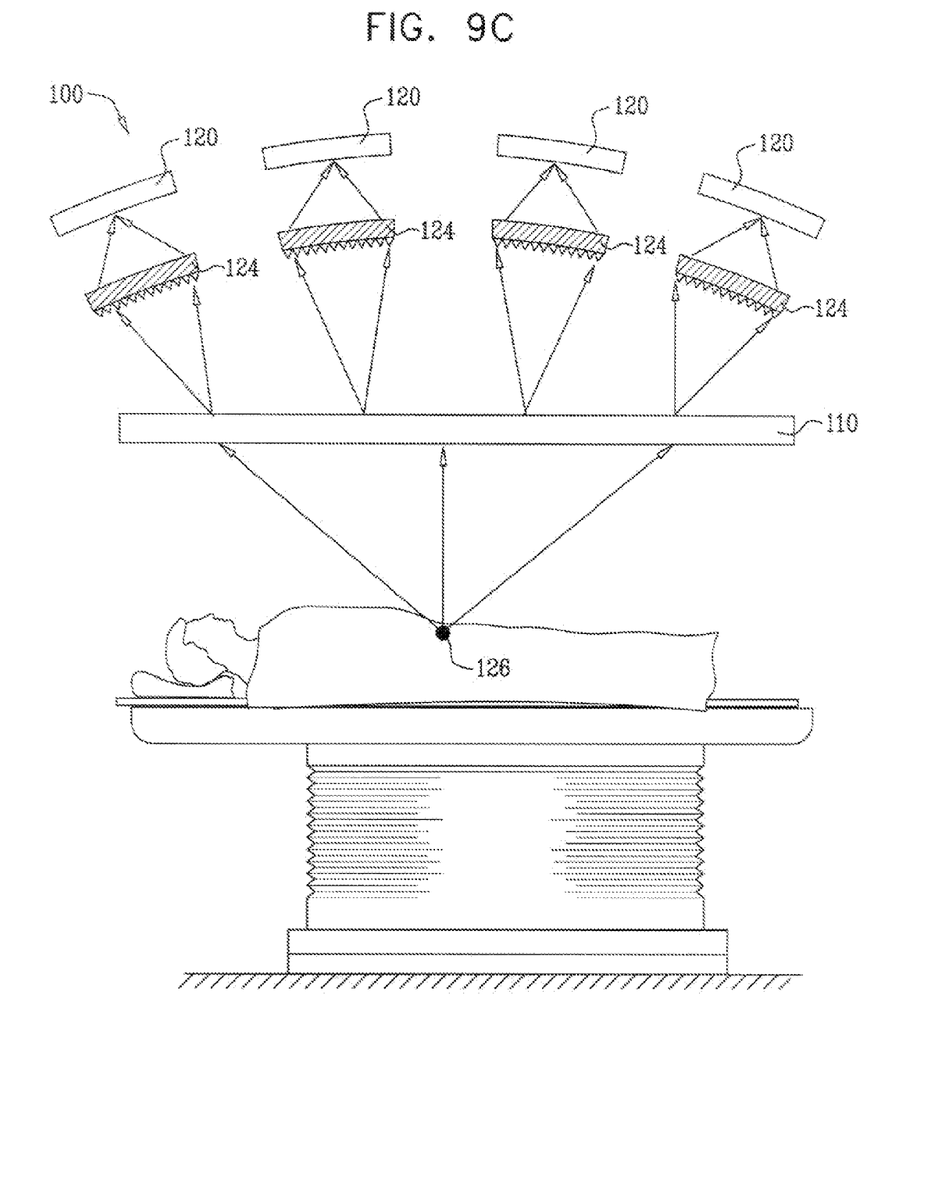

Reference is made to FIGS. 9A-C, which are schematic illustrations of alternative configurations of system 100, in accordance with respective embodiments of the present invention. As can be seen in these figures, system 100 may comprise only a portion of the lenses described hereinabove. In addition, system 100 may comprise a plurality of primary and/or secondary detectors 110 and 120.

In an embodiment of the present invention, new lenses to be placed onto a detector surface are provided. Such placement generally minimizes photon losses between the large ring lenses and the detectors. Various techniques such as physical vapor deposition and sputtering are typically utilized for depositing the lenses. Diffraction angle and focal point can be adjusted by altering the thickness of the deposited lenses. In this embodiment, two sets of lenses are typically provided. A first set of lenses comprises a large ring system between the patient and the detector, and a second set of lenses comprises smaller lenses incorporated on the surface of each detector, as shown, for example, in FIGS. 9A-C.

Figure 6A:
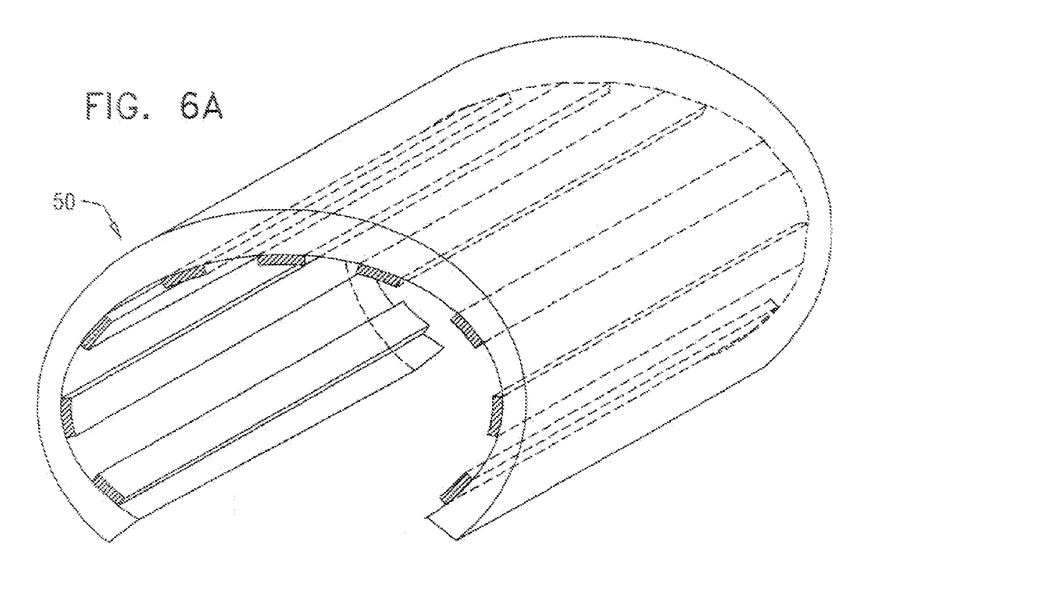
FIG. 6A is a schematic illustration of a C-shaped cuff gamma ray lens, in accordance with an embodiment of the present invention.
Figure 6B:
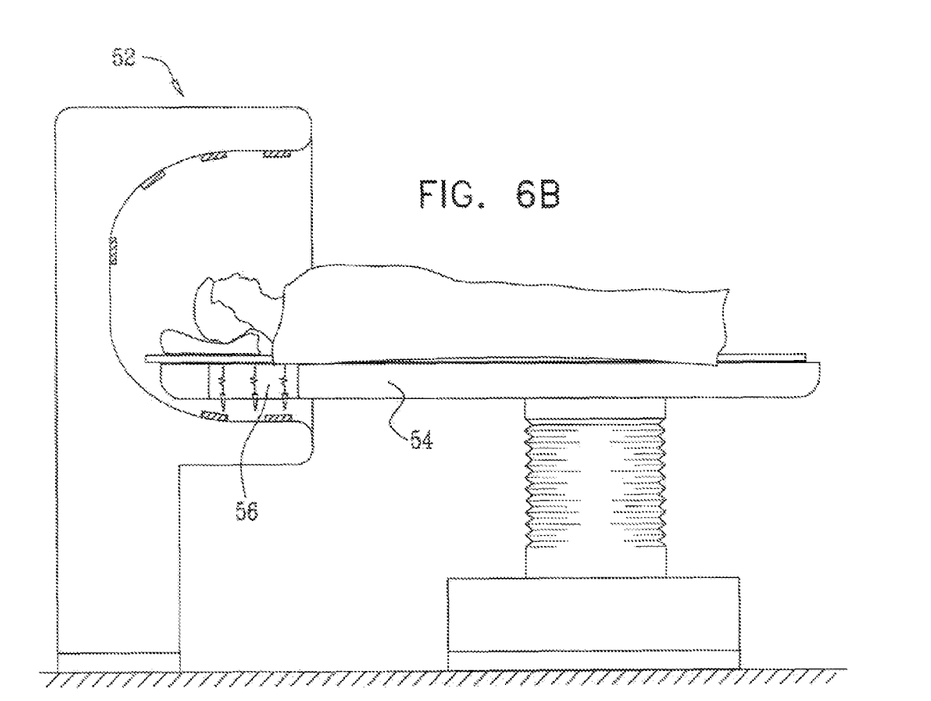
FIG. 6B is a schematic illustration of a C-arm gamma ray lens holder, in accordance with an embodiment of the present invention.

FIG. 6A is a schematic illustration of a C-shaped cuff gamma ray lens system 50, in accordance with an embodiment of the present invention, and FIG. 6B is a schematic illustration of a C-arm gamma ray lens holder 52, in accordance with an embodiment of the present invention. In these embodiments, the lens arrays are positioned in C-arm fashion or be completely wrapped around the patient. It is difficult to do so using techniques known in the art, because of the large number of fixed rings. For some applications, a bed 54 is provided that at least a portion 56 of which is transparent to gamma rays. For example, a specific window may be used In order to focus beams from various directions. For example, a gamma-transparent window may be provided that is positioned under the portion of the patient containing a region of interest (ROI). For some applications, the entire bed, or substantially the entire bed, is transparent to gamma rays.

In an embodiment of the present invention, the lens array system described herein is able to construct in real-time 3D image pinpointing the area of interest.

In some embodiments of the present invention, system 100 comprises at least one lens that comprises a coating thereon. For example, the coating may comprises an anti-reflection coating, which minimizes reflection at the surface. For some applications, the coating uses a multi-layer index matching approach, as known in the art of optical lenses for focusing visible light.

FIG. 3 is a schematic cross-sectional illustration of a multi-layer stacked gamma ray lens 200, in accordance with an embodiment of the present invention. Lens 200 comprises at least two layers 202A and 202B, and typically at least three layers 202A, 202B, and 202C. The materials of the layers are typically selected to provide alternating layers of relatively high and relatively low indices of refraction, e.g., high/low/high or low/high/low, in order to provide a "graded index," as is known in the art of optical lenses for visible light. This multi-layer construction generally improves absorption. The layer typically comprise dense material such as cooper, germanium, and quartz. Adjacent layers comprise different material than one another, in order to provide differing indicia of refraction. For some applications, a first layer (e.g., layer 202A) is thinner than a second layer (e.g., layer 202B), and, if lens 200 comprises three or more layers, the second layer is thinner than a third layer, e.g., layer 202C. (In the figure, thickness X is less than thickness Y, which is less than thickness Z.) This can also be in any thickness combination. This technique helps maximize focusing capabilities and thereby increasing the sensitivity, e.g. for localizing a tumor of 1 mm or less in size.

Figure 4:
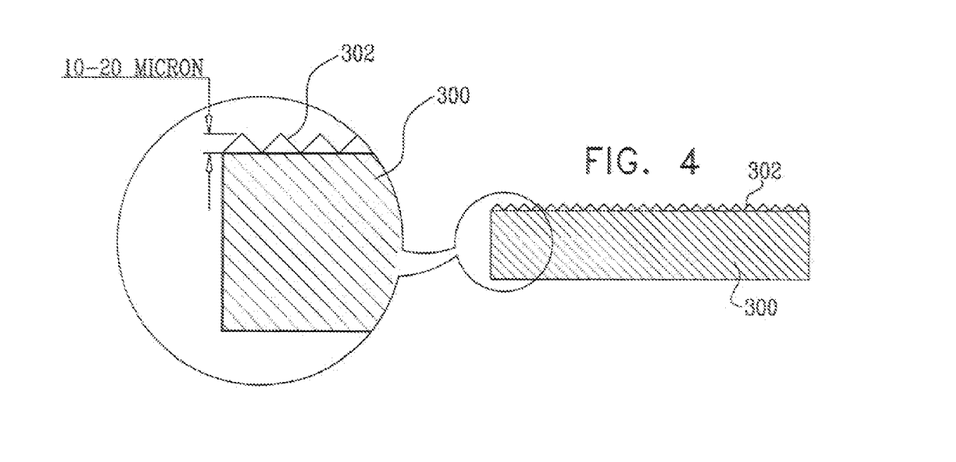
FIG. 4 is a schematic cross-sectional illustration of a gamma ray lens with a microporous surface, in accordance with an embodiment of the present invention.

FIG. 4 is a schematic cross-sectional illustration of a gamma ray lens 300 with a microporous surface 302 (i.e., a microporous structure), in accordance with an embodiment of the present invention. For some applications, at least one of the lenses or the primary or secondary detectors described herein is provided with microporous surface 302. Microporous surface 302 improves scattering while maintaining the small physical size of the lenses and/or detectors. Surface 302 allows a small geometric surface area of lens 300 to have a large photon collecting surface. For some applications, the microporous surface is provided by applying a microporous coating to the lens or detector, such as by using ion implantation, while for other applications the surface of the lens or detector is treated to create a microporous layer. Typically, the microporous surface includes an organized crystalline structure, e.g., diamond-shaped crystals. Alternatively, the surface is randomly or quasi-randomly organized. The microporous surface further enhances the entrapment of incoming radiation and minimizing reflection. This is advantageous for a catheter-based probe with a gamma lens. For some applications, the microporous structure comprises one or more powders. Prior art metallic and non-metallic lens such as cooper, germanium, quartz, and other are made of single layer solid piece. For some applications, microporous surface 302 has a thickness of between about 10 and 20 microns (compared to a typical thickness of the lenses described herein of between about 100 and about 200 microns, and a typical thickness of the CZT crystal of the detectors of between about 100 and about 700 microns, e.g., about 200 microns).

In an embodiment of the present invention, microporous surface 302 is applied directly to a primary or secondary detector. In an embodiment of the present invention, microporous surface 302 is applied to a lens described herein, which is coupled directly to a primary or secondary detector.

Figure 5:
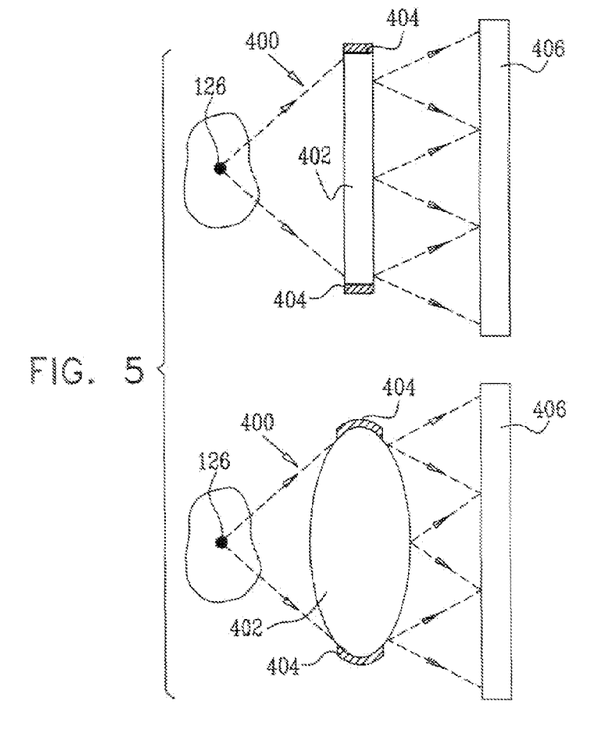
FIG. 5 is a schematic illustration of an accommodating gamma ray lens assembly, in accordance with an embodiment of the present invention.

FIG. 5 is a schematic illustration of an accommodating gamma ray lens assembly 400, in accordance with an embodiment of the present invention. Lens 400 has an accommodating lens construction similar to natural lens of the human eye that constantly adapt to near-sightedness and far-sightedness by use of ciliary muscles. Lens assembly 400 comprises a lens 402 that comprises one or more flexible materials that are pliable, and semi-rigid sides 404 to change the focal length by exerting force on the lens 402 and changing its shape. Similar implantable eye lens being developed for treatment of presbyopia. The lens is constructed from pliable material with an adjustable edge or cuff. Adjustability is controlled using an algorithm and computer calculations based on the number of portion being captured/detected in addition to their energy levels (KeV).

Figure 7:
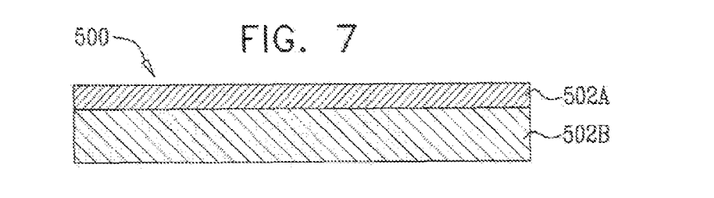
FIG. 7 is a schematic cross-sectional illustration of a composite gamma ray lens, in accordance with an embodiment of the present invention.

FIG. 7 is a schematic cross-sectional illustration of a computer gamma ray lens 500, in accordance with an embodiment of the present invention. Composite lens 500 comprises a plurality of materials organized in a plurality of layers 502, e.g., layers 502A and 502B, e.g., two different materials, such as copper on germanium. Lens 500 may be manufactures, for example, by physical vapor deposition (sputtering) or ion implantation techniques. Various density, morphology, porosity can be created on both materials in order to optimize lens focus capabilities. For some applications, the base material in a solid piece that is further enhanced by sputtering, and then the second layer is deposited onto it.

Figure 8:
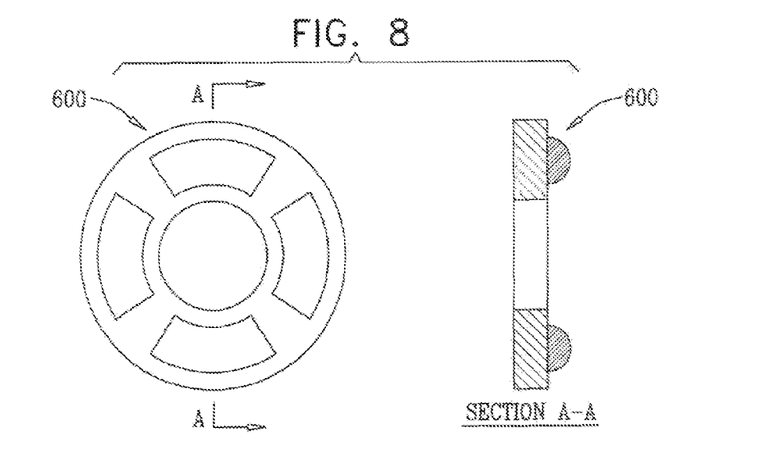
FIG. 8 includes schematic illustrations of a semi-hemispherical or hemi-spherical lens system, in accordance with an embodiment of the present invention.

FIG. 8 includes schematic illustrations of a semi-hemispherical or hemi-spherical lens system 600, in accordance with an embodiment of the present invention. Conventional gamma lenses are limited in sensitivity because the construction of such lenses is flat, and, with such configurations, the solid angle is small. In this embodiment of the present invention, lens system 600 is semi-hemispherical or hemi-spherical where the solid angle is large. This configuration sharply increases both the depth of view and the number of photons focused, with smaller and fewer lenses.

In an embodiment of the present invention, additional lenses are placed together to form a hemisphere above the patient, and, optically, another hemisphere below the patient. The greater the number of lenses covering the solid angle to which a source can emit photons, the higher the sensitivity. Theoretically, with a full sphere covered with lenses and detectors behind them, sensitivity may be achieved that is 10 or 100 times greater than the sensitivity that exist today in gamma imaging, and these photons can serve the reconstruction so as long as their depth of field is set towards the region of interest. Furthermore, for some applications, a mechanical system is provided which enables moving in and out of each of the lenses, such that each lens becomes focused on the region of interest. Alternatively, the construction of each lens is mechanically modulated to change its focal length.

For some applications, in addition or instead of rotating around the patient, the lens and/or detector assembly is moved in other directions. For example, the lens and/or detector assembly may be moved such that a plurality of positions of the individual lens and/or detectors thereof define all or a portion of a sphere around a region of interest of the patient. For example, the assembly may be rotated around a line defined by the intersection of a plane defined by the assembly and a plane defined by a bed on which the patient lies.

Although techniques described herein nave been generally described as applicable to medical imaging, it will be appreciated that these techniques may also be applied to nonmedical applications, such as quality control and astrophysics.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A gamma ray camera system comprising:
   a lens system comprising at least one crystal diffraction lens; and
   a camera, configured to:
   perform three-dimensional gamma ray imaging of a first region of a volume of interest using the lens system, and
   perform three-dimensional gamma ray imaging of a second region of the volume of interest without using the lens system,
   wherein the second region has a volume at least 10 times a volume of the first region.

2. The system according to claim 1, wherein the volume of the second region is at least 100 times the volume of the first region.

3. The system according to claim 1, wherein the camera and lens system are configured to image the first region with a first sensitivity equal to at Least 10 times a second sensitivity of imaging of the second region.

4. The system according to claim 3, wherein the first sensitivity is at least 100 times the second sensitivity.

5. The system according to claim 1, wherein the camera is configured to simultaneously image the first and second regions.

6. The system according to claim 1, wherein the camera is configured to image the second region after completing imaging of the first region.

7. The system according to claim 6, wherein the camera is configured so set at least one parameter of imaging of the, second region at least in part responsively to information derived from imaging the first region.

8. The system according to claim 1, wherein the camera is configured to image the first region after completing imaging of the second region.

9. The system according to claim 8, wherein the camera is configured so set at least one parameter of imaging of the first region at least in part responsively to information derived from imaging the second region.

10. A method for gamma ray imaging comprising:
    performing three-dimensional gamma ray imaging of a first region of a volume of interest using a lens system that includes at least one crystal diffraction lens; and
    performing three-dimensional gamma ray imaging of a second region of the volume of interest without using the lens system,
    wherein the second region has a volume at least 10 times a volume of the first region.

11. The method according to claim 10, wherein the volume of the second region is at least 100 times the volume of the first region.

12. The method according to claim 10, wherein performing the imaging of the first and second regions comprises simultaneously performing the imaging of the first and second regions.

13. The method according to claim 10, wherein performing the imaging of the first and second regions comprises performing the imaging of the second region after completing the imaging of the first region.

14. A gamma ray camera system comprising:
    at least one gamma ray photon detector;
    a lens system comprising at least one crystal diffraction lens; and
    a control component, configured to adjust a focal length of the lens by changing a shape of the lens.

15. The system according to claim 14, wherein the control component is configured to adjust the focal length during an imaging procedure performed by the camera system.

16. A gamma ray camera system comprising:
    at least one gamma ray photon detector;
    a lens system comprising at least two crystal diffraction lenses; and
    a control component, configured to adjust a focal length of the lens system by rotating at least one of the lenses with respect to at least another of the lenses.

17. The system according to claim 16, wherein the lens system further comprises at least two concentrically-arranged cylindrical lens holders, configured to hold the at least two lenses, respectively, and wherein the control component is configured to rotate the at least one of the lenses with respect to the at least another of the lenses by rotating at least one of the cylindrical lens holders with respect to at least another one of the cylindrical lens holders.

* * * * *